United States Patent Office 2,956,964
Patented Oct. 18, 1960

2,956,964

COMPOSITION COMPRISING REACTION PRODUCT OF ALDEHYDE AND POLYCARBAMATE AND METHOD OF PREPARING

Roger M. Christenson, Whitefish Bay, and Norman A. Jacobson, Clinton, Wis., assignors to Pittsburgh Plate Glass Company No Drawing. Filed Sept. 13, 1954, Ser. No. 455,762

15 Claims. (Cl. 260—15)

This invention relates to resinous condensation products useful as film forming materials in coating compositions, and for other purposes, and pertains more particularly to the resinous products obtained by the condensation of an aldehyde with a polycarbamate, which polycarbamate is the reaction product of urea and an alkyd resin containing free hydroxyl groups.

Attempts have been made to utilize carbamates, either per se, or the product obtained by condensing carbamates with aldehydes, in coating compositions. However, it has been found that many of these materials are unsuitable because they have low compatibility with resinous or plastic materials and/or because they are too volatile.

It has now been discovered that certain complex polycarbamates derived from alkyd resins can be modified by condensation with aldehydes, and particularly formaldehyde, to give a variety of resinous materials, depending upon the alkyd resin utilized in preparing the polycarbamate. Some of the resinous condensation products are useful as film forming materials, either per se, or as components of coating compositions. Others are useful as plasticizers for resins or for other purposes.

In accordance with the present invention, the novel resinous materials are obtained by first reacting an alkyd resin containing free hydroxyl groups with urea to obtain a long chain polycarbamate, and then condensing said polycarbamate with an aldehyde.

The alkyd resin utilized in preparing the long chain polycarbamate may be one of those which are readily obtainable as commercial products. Such materials can be prepared, for example, by heating a glycol such as ethylene glycol with a carboxylic acid such as adipic acid, phthalic acid or the corresponding anhydride. Generally, the esterification reaction to obtain an alkyd resin is carried out simply by admixing the glycol with acid or anhydride in a reactor equipped with an agitator, heating means and a temperature measuring device. If desired, an esterification catalyst such as litharge or para-toluenesulfonic acid can be employed. Heating of the reaction mixture at about 200° C. for a period of from about 5 to 8 hours ordinarily produces a clear, amber, viscous resin suitable for the preparation of resinous condensation products in accordance with this invention. The resin when prepared in the above manner has an acid value which is ordinarily below about 40.

In order that the alkyd resin will possess free primary hydroxyl groups which will in turn react with urea to form a carbamate group, it is necessary that excess glycol or polyol be utilized in preparing said alkyd resin. Ordinarily, a molar excess of about 20 percent to 40 percent will provide the necessary free primary hydroxyl groups; however, an excess of as much as 100 percent or more may be utilized with good results. Preferably, the alkyd resin should have an hydroxyl value in excess of about 40, and may, in fact, have an hydroxyl value as high as 475 or even higher.

Another type of alkyd resin useful in the preparation of the resinous condensation products of this invention is the oil modified type. These alkyd resins are prepared by heating an acid or anhydride such as phthalic acid or phthalic anhydride, with various polyols, together with a drying oil derivative modified by ester interchange with a polyol in order to form the monogylcerides or diglycerides of fatty acids.

In some instances, "oil modification" is effected by first reacting the free fatty acids of a glyceride oil, ordinarily a drying oil, with a polyol to form mono- or diglycerides or mixtures thereof. These partial esters may then be incorporated with phthalic acid and a polyol (if required) and the mixture can be heated to form a polyester. The oil modified resins can also be obtained by incorporation of the fatty acids and glycerine with phthalic acid or anhydride and heating the mixture to reaction temperature. Normally, the polyester will contain 30 percent to 70 percent and preferably 40 percent to 70 percent by weight or slightly more or less of the glyceride oil or its equivalent of mono- or diglycerides. Such resins are ordinarily spoken of as being 30 percent to 70 percent or 40 percent to 70 percent oil modified.

Among the polyols, or polyhydric alcohols, which may be utilized in preparing alkyd resins having excess hydroxyl groups are included ethylene glycol, diethylene glycol, propylene glycol, glycerol, polyethylene glycol, sorbitol, tetramethylolcyclohexanol, erythritol, pentaerythritol, dipentaerythritol, polypentaerythritol, ethanolamine, diethanolamine, and the like, as well as mixtures of any two or more of the above compounds. Pentaerythritol is particularly preferred.

The acid component of the alkyd resin may be a saturated aliphatic dicarboxylic acid such as malonic acid, succinic acid, glutaric acid, adipic acid, pimelic acid, suberic acid, azelaic acid, or sebacic acid; an acid having an aromatic nucleus such as phthalic acid, benzoic acid, or tertiary butyl benzoic acid; or an unsaturated acid such as maleic acid or fumaric acid. Other acids which may be used include ether acids such as diglycolic acid, dilactic acid, or salicylacetic acid; ketone acids such as benzophenone-2,4'-dicarboxylic acid or benzoyl-benzoic acid. Tricarboxylic acids may also be used, as may the anhydrides of any of the acids listed above.

The oil component, if one is utilized, is generally employed in the form of the fatty acid. Convenient sources of these acids are the drying and semi-drying oils such as linseed oil, cottonseed oil, safflower oil, soybean oil, tung oil, oiticica oil, menhaden oil, sardine oil and the like. Soap stocks from the refining of these oils are also sources of materials which may be utilized in the process of preparing alkyd resins for use in the present invention. Other acids which may be used include those containing a plurality of non-conjugate double bonds, for example, linoleic acid, linolenic acid, and the like. Additionally, the preparation of the alkyd resin can be carried out utilizing a mixture of one of the drying oil acids set forth above together with a saturated polycarboxylic acid such as malonic acid, succinic acid, glutaric acid, adipic acid, palmitic acid, suberic acid, azelaic acid, and the like. In place of the phthalic anhydride, an unsaturated acid such as maleic acid (or anhydride) or fumaric acid may be employed.

The alkyd resin prepared according to the foregoing methods, or according to other methods known in the art, is then reacted with urea to form a polycarbamate, the reaction taking place between the urea and the primary hydroxy groups of the alkyd resin. If the alkyd utilized is a linear easter prepared by the reaction of a dicarboxylic acid with a dihydric compound, said ester will have two primary hydroxyl groups, and will react with urea to form a dicarbamate. However, an alkyd resin prepared from a glycol having three or more hydroxyl groups may react with urea to give a material having three or more carbamate groups. Thus, the term "polycarbamate," as utilized herein, is intended to include the dicarbamates as well as those materials containing three or more carbamate groups. Many of the alkyds utilized may contain one or more secondary hydroxyl groups in addition to the two terminal or primary hydroxyl groups. However, the secondary hydroxyls are ordinarily not reactive enough to form carbamate groups by reaction with the urea.

The reaction of the free hydroxyl containing alkyd resin with urea takes place quite readily in the presence of a metal or metal salt which functions as a catalyst. Suitable catalysts include zinc chloride, zinc acetate, silver nitrate, anhydrous cobalt chloride, anhydrous cupric sulfate, anhydrous tin dichloride, tin tetrachloride and the like, with zinc acetate being particularly useful. One preferred method of preparing the polycarbamate involves admixing the alkyd resin and the urea in a reactor equipped with agitator and a reflux condenser. Xylene is employed as an inert diluent and the resulting mixture is heated to distill off the water azeotropically. The acidic catalyst is then added and the reaction mixture refluxed for a period of about 12 to 20 hours at a temperature of about 120° C. to 150° C., after which the xylene layer is distilled off, using an inert gas to aid in the removal of the xylene. The polycarbamate is ordinarily recovered in the form of a light amber, viscous liquid.

The alkyd resin and the urea can be brought together in any desired amount, although in general, it is preferred that they be used in equivalent amounts.

The long chain polycarbamates obtained in this manner are condensed with an aldehyde to form the resinous condensation products of the present invention. For reasons of economy and ease of condensation, formaldehyde, in the form of an aqueous solution or an alcoholic solution, is the preferred aldehyde; however, other aldehydes such as paraformaldehyde, acetaldehyde, butyraldehyde, acrolein, crotonaldehyde, methacrolein, betaethyl acrolein, furfural, benzaldehyde, glyoxal, or compounds capable of acting as aldehydes, for example, hexamethylene-tetra-amine, may also be utilized.

The condensation itself is carried out by admixing the dicarbamate and the aldehyde and water (if used) in a reactor fitted with a reflux condenser. The pH of the mixture is then adjusted to about 2.0 to 4.0 with an acidic material such as hydrochloric acid, phosphoric acid, oxalic acid, or the like and the catalyzed mixture refluxed for about 10 to 15 hours at a temperature of about 100° C., the water being constantly distilled off. The resin is then filtered to give a material which is generally clear, viscous and light yellow or amber. Preferably, the aldehyde is utilized in a ratio of about 2.0 to 3.0 moles per mole of the polycarbamate, although the ratio may be as high as 4.0 to 1 or as low as 0.50 to 1 with generally equivalent results. If desired, a basic catalyst such as sodium hydroxide, potassium hydroxide, or the like may be substituted for an acidic material to accelerate the condensation.

The following examples illustrate the preparation of alkyd resins having free hydroxyl groups, the reaction of such alkyd resins with urea to give complex polycarbamates, and the condensation of such dicarbamates with aldehydes to give the resinous reaction products of the present invention. The examples are not intended to limit the invention, however, because there are, of course, numerous possible variations and modifications.

Examples I to XII

A series of alkyd resins containing free primary hydroxyl groups was prepared by heating a glycol with a polycarboxylic acid (or anhydride). The reaction in each instance was carried out by heating the glycol in a reactor equipped with agitator, steam jacketed condenser and temperature measuring means. The acid component was then added at a temperature of about 100° C. and the resulting mixture refluxed at 200° C. for a period varying from about 4 to 10 hours. In each run, the product was a clear, amber, viscous resin. The composition and properties of the alkyd resins are set forth in the following table:

| Example | Reactants | | Acid to Glycol Mole Ratio | Reaction Time | ° C. Temp. Range | Acid Value | Hydroxyl Value | Percent Solids |
|---|---|---|---|---|---|---|---|---|
| I | A | B | 1:2 | 7 | 200 | 8.65 | 420.5 | 89.75 |
| II | A | B | 1:2 | 9 | 200 | 11.05 | 405.1 | 89.1 |
| III | A | B | 2:3 | 8 | 200 | 14.4 | 252.4 | 97.6 |
| IV | A | B | 3:4 | 7 | 200 | 23.5 | 173.5 | 99.1 |
| V | A | B | 5:6 | 6 | 200 | 25.7 | 109.0 | 99.5 |
| VI | A | B | 7:8 | 7 | 200 | 39.8 | 102.2 | 99.5 |
| VII | A | D | 1:2 | 8 | 200 | 7.85 | 462.0 | 87.65 |
| VIII | A | D | 1:2 | 6 | 200 | 8.25 | 419.0 | 87.1 |
| IX | A | E | 1:2 | 6 | 190–200 | 7.35 | 177.5 | 94.35 |
| X | C | D | 1:2 | 4.5 | 175 | 12.8 | 458.0 | 97.8 |
| XI | C | D | 1:2 | 6.5 | 215 | 8.9 | 312.0 | 99.7 |
| XII | C | E | 1:2 | 5 | 180 | 1.43 | 164.0 | 99.4 |

A—Ethylene glycol.
B—Phthalic anhydride.
C—Monoethanolamine.
D—Adipic acid.
E—Polymerized dimer fatty acid.

Example XIII

The alkyd resin prepared according to Example VIII was reacted with urea to form a dicarbamate as follows:

Thirteen hundred forty-two grams (5 moles) of ethylene glycol adipate and 1500 grams xylene were charged into a glass reactor fitted with agitator, wide bore air reflux condenser and temperature measuring means. Six hundred grams (10 moles) of urea was added at 100° C. The water was azeotroped off first, using an azeotropic separator and a xylene leg. When the temperature reached 120° C., 40 grams of zinc acetate were added and the reaction mixture refluxed for 16 hours at 133° C. to 138° C. The xylene layer was then distilled off using an inert gas as an aid. The product was a light amber, viscous liquid which formed hard films on steel plate.

*Examples XIV to XXII*

A series of dicarbamates was prepared from certain of the alkyd resins of Examples I to XII, utilizing generally the method described in Example XIII. The composition of these dicarbamates, the percent solids, and the carbamate hydroxyl value (based on 100 percent solids) are set forth in the following table:

| Example | Alkyd Resin | Acid/Glycol Mole Ratio in Alkyd | Alkyd Resin/Urea Mole Ratio | Percent Solids Crude Dicarbamate | Carbamate Hydroxyl Value (100% Solids) |
|---|---|---|---|---|---|
| XIV | (1) | 1:2 | 1:2 | 93.0 | 26.8 |
| XV | (2) | 1:2 | 1:2 | 88.0 | 94.5 |
| XVI | (2) | 2:3 | 1:2 | 84.9 | 71.6 |
| XVII | (2) | 3:4 | 1:2 | 90.1 | 73.3 |
| XVIII | (2) | 5:6 | 1:2 | 89.7 | 57.5 |
| XIX | (2) | 7:8 | 1:2 | 91.6 | 52.3 |
| XX | (3) | 1:2 | 1:2 | 89.0 | |
| XXI | (4) | 1:2 | 1:2 | 92.3 | 34.4 |
| XXII | (5) | 1:2 | 1:2 | 82.8 | 64.5 |

(1)—Ethylene glycol-adipic acid.
(2)—Ethylene glycol-phthalic anhydride.
(3)—Monoethanolamine-adipic acid.
(4)—Ethylene glycol-dimer fatty acid.
(5)—Monoethanolamine-dimer fatty acid.

*Example XXIII*

Fourteen hundred seventy-nine grams (4 moles) of ethylene glycol-adipate-dicarbamate (86.7 percent solids), 750 grams (4 moles) of a solution of formaldehyde in butyl alcohol, and 475 grams of butanol were charged into a glass reactor fitted with reflux condenser, agitator, and temperature measuring means. The pH of the resulting mixture was adjusted to 3.0 with 85 percent phosphoric acid and the mixture refluxed for 8 hours. The water was then azeotroped off using a butanol leg. The temperature was raised to 120° C. and the resin filtered to give a clear, yellow, viscous material. The yield was 2551.8 grams at a total solids of 61.4 percent.

The resinous product thus obtained was compatible with nitrocellulose and vinyl chloride-vinyl acetate copolymer resins. Films of the blends obtained by plasticizing nitrocellulose and vinyl acetate-vinyl chloride copolymers with the resinous material of this example were prepared by drawing them with a 0.003 inch draw bar onto a steel panel from a 40 percent solids solution. The films were baked at 180° F. for about 30 minutes. The properties of the films are set forth in the following table:

| Blend | Sward Hardness | Impact (Inch-Pounds) | Bend | Knife Cut Test |
|---|---|---|---|---|
| 50% Dicarbamate-Formaldehyde Resin, 50% ¼ sec. Nitrocellulose. | 12 | 17 | >20 | Flexible. |
| 60% Dicarbamate-Formaldehyde Resin, 40% ¼ sec. Nitrocellulose. | 6 | >48 | >20 | Do. |
| 50% Dicarbamate-Formaldehyde Resin, 50% ½ sec. Nitrocellulose. | 10 | >48 | >20 | Do. |
| 30% Dicarbamate-Formaldehyde Resin, 70% Carboxyl-Modified Vinyl Chloride-Vinyl Acetate Copolymer. | 10 | >48 | >20 | Do. |

*Examples XXIV to XXVII*

A series of dicarbamates (prepared from glycol-polycarboxylic acid alkyd resins) was condensed with formaldehyde, the reaction in each instance being carried out essentially according to the method of Example XXIII. The resinous products obtained were drawn onto steel panels and baked at a temperature of about 300° F. for 30 minutes. The pertinent data is recorded in the following table:

| Example | Dicarbamate Used | Formaldehyde/Dicarbamate Mole Ratio | Solvent | pH | Gardner Color Value | Percent Solids |
|---|---|---|---|---|---|---|
| XXIV | A | ¹ 2:1 | Water | 3.0 | 2-3 | 38.6 |
| XXV | B | ² 2.5:1 | Butanol | 3.0 | 1 | 71.6 |
| XXVI | C | ¹ 2:1 | Water | 2.0 | | |
| XXVII | C | ² 2.5:1 | Butanol | 2.0 | 9-10 | 64.3 |

¹ 37 Percent formalin.
² Butanol solution of formaldehyde.
A—Ethylene glycol-adipate-dicarbamate.
B—Ethylene glycol-phthalate-dicarbamate.
C—Diethanol-adipamide-dicarbamate.

*Examples XXVIII to XXXIII*

Dicarbamate-formaldehyde resinous condensation products, prepared according to the method of Example XXIII, were drawn onto steel panels from a 40 percent solids solution, and the films baked at 350° F. for 30 minutes. The composition of the resinous material and the film properties are set forth in the following table:

| Example | Alkyd Resin Components | Glycol/Acid Ratio | Sward Hardness | Mar Resistance | Color | Alkali Resistance 3% NaOH (Hours) |
|---|---|---|---|---|---|---|
| XXVIII | Ethylene glycol Phthalic anhydride | 2:1 | 56 | Good | None | >48 |
| XXIX | do | 2:1 | 56 | do | do | >48 |
| XXX | do | 3:2 | 32 | do | do | >48 |
| XXXI | do | 4:3 | 30 | do | do | >48 |
| XXXII | do | 6:5 | 34 | do | do | >48 |
| XXXIII | do | 8:7 | 34 | do | do | >48 |

*Examples XXXIV to XXXVIII*

A series of oil-modified alkyd resins containing free primary hydroxyl groups was prepared by heating the various reactants at a temperature of about 220° C., utilizing xylene as a solvent. An azeotropic separator was used to remove the water. The composition and properties of the alkyd resins are set forth in the following table:

| Composition | Examples (Percent) | | | | |
|---|---|---|---|---|---|
| | XXXIV | XXXV | XXXVI | XXXVII | XXXVIII |
| Pentaerythritol | 25.7 | 22.9 | 28.8 | 20.6 | 24.9 |
| Phthalic Anhydride | 29.5 | 25.0 | 31.4 | | |
| Cottonseed Oil Fatty Acids | 44.1 | 47.9 | | 85.0 | |
| Coconut Oil Fatty Acids | | | 47.5 | | 82.0 |
| Benzoic Acid | 8.1 | | | | |
| Excess Polyol (molar) | 21.4 | 33⅓ | 33⅓ | 100.0 | 100.0 |
| Analysis: | | | | | |
| Acid Value | 5.79 | 1.99 | 3.13 | 5.59 | 6.88 |
| Hydroxyl Value | 46.59 | 54.39 | 60.0 | 159.6 | 178.9 |
| Solids | 50.75 | 48.7 | 49.95 | 100.0 | 99.3 |

*Examples XXXIX to XLIV*

The alkyd resins prepared according to the foregoing examples were utilized in the preparation of polycarbamates. In each case the reaction was carried out utilizing an equivalent amount of urea for each equivalent hydroxyl group present in the alkyd resin. Zinc acetate was utilized as the catalyst. The reaction was carried out by admixing the alkyd resin and xylene in a reactor equipped with agitator, temperature measuring device, and an air reflux condenser. The mixture was heated to about 100° C. and the urea added. The water was azeotroped off first, using an azeotropic separator. When the temperature reached 120° C., the catalyst was added and the mixture refluxed for about 16 hours at a temperature of about 133° C. to 138° C. The xylene layer was then distilled off using inert gas as an aid in the removal. The following table sets forth the alkyd resin employed, the equivalence of urea for each equivalent of alkyd hydroxyl, the percent solids of the polycarbamate, and the hydroxyl values of both the alkyd and the polycarbamate.

| Example | Alkyd Prepared according to Method of Example— | Equivalents Urea/Alkyd (OH) | Percent Solids | Hydroxyl Value of Alkyd Resin | Hydroxyl Value of Polycarbamate |
|---|---|---|---|---|---|
| XXXIX | XXXIV | 1:1 | 44.75 | 46.59 | 19.5 |
| XL | XXXV | 1:1 | 50.05 | 54.4 | 31.8 |
| XLI | XXXVI | 1:1 | 52.8 | 60.0 | 34.0 |
| XLII | XXXVII | 1.2:1 | 88.8 | 159.6 | 80.2 |
| XLIII | XXXVIII | 1.2:1 | 83.8 | 178.9 | 83.7 |
| XLIV | XXXVI | 2:1 | 52.6 | 60.0 | 43.1 |

*Examples XLV to XLVIII*

Polycarbamates prepared from oil modified alkyd resins according to Examples XL to XLIII were condensed with formaldehyde (butanol solution) according to the following general procedure: The polycarbamate, butanol solution of formaldehyde and additional butanol (as a solvent) were placed in a glass reactor equipped with agitator, reflux condenser and temperature measuring means. The resulting mixture was refluxed for about 7 hours at 105° C. An azeotropic separator was then added to the system and the water azeotroped off to temperatures up to 120° C. The formaldehyde/polycarbamate ratio utilized in preparing the condensates, together with the percent solids, the viscosity, and color of the condensates are set forth in the following table:

| Example | Polycarbamate prepared According to Method of Example— | Formaldehyde/polycarbamate Mole Ratio | Percent Solids | Gardner Viscosity | Gardner Color |
|---|---|---|---|---|---|
| XLV | XL | 2.5:1 | 44.3 | C–D | 7–8 |
| XLVI | XLI | 2.5:1 | 42.2 | L–M | 6–7 |
| XLVII | XLII | 2.5:1 | 73.8 | A | 12 |
| XLVIII | XLIII | 2.5:1 | 68.4 | A | 9–10 |

The resinous condensation products thus prepared are excellent film forming materials, giving films which adhere well to metal or other surfaces and which possess good hardness, flexibility and alkali resistance. Useful resinous condensation products can also be obtained when other aldehydes, such as acetaldehyde or butyraldehyde are substituted for formaldehyde in the above examples.

As is apparent from the foregoing examples, the resinuous condensation products of the present invention are useful film forming materials. As such, they can be utilized in paints and other coating compositions. Such compositions may contain such added materials as coloring pigments, fillers, driers and the like. The resulting compositions can be applied by spraying, brushing, dipping, or flow coating to surfaces such as metal, wood, glass and the like.

From the foregoing description it is apparent that the resinous condensation products of the present invention constitute a new and useful class of materials. It will also be apparent to those skilled in the art that numerous variations and modifications can be made in the compositions described herein without departing from the spirit and scope of the invention as defined in the appended claims.

We claim:

1. A resinous condensation product resulting from heating an aldehyde and a polycarbamate, said aldehyde being utilized in an amount of about 0.5 mole to 4.0 moles per mole of polycarbamate, said polycarbamate being the heat reaction product of urea and a free hydroxyl-containing alkyd resin in the presence of a metal salt selected from the group consisting of zinc chloride, zinc acetate, silver nitrate, anhydrous cobalt chloride, anhydrous cupric sulfate, anhydrous tin dichloride and tin tetrachloride.

2. A resinous condensation product resulting from heating formaldehyde and a polycarbamate, said formaldehyde being utilized in an amount of about 0.5 mole to 4.0 moles per mole of polycarbamate, said polycarbamate being the heat reaction product of urea and a hydroxyl-containing alkyd resin in the presence of a metal salt selected from the class consisting of zinc chloride, zinc acetate, silver nitrate, anhydrous cobalt chloride, anhydrous cupric sulfate, anhydrous tin dichloride, and tin tetrachloride.

3. A resinous condensation product resulting from heating formaldehyde and a polycarbamate, said formaldehyde being utilized in an amount of about 0.5 mole to 4.0 moles per mole of polycarbamate, said polycarbamate being the heat reaction product of urea and a free hydroxyl-containing alkyd resin, in the presence of a metal salt selected from the class consisting of zinc chloride, zinc acetate, silver nitrate, anhydrous cobalt chloride, anhydrous cupric sulfate, anhydrous tin dichloride, and tin tetrachloride, an equivalent amount of urea being utilized for each equivalent hydroxyl group present in said alkyd resin.

4. The method of preparing a resinous condensation product which comprises heat reacting urea and a free hydroxyl-containing alkyd resin in the presence of a metal salt selected from the class consisting of zinc chloride, zinc acetate, silver nitrate, anhydrous cobalt chloride, anhydrous cupric sulfate, anhydrous tin dichloride, and tin tetrachloride, to obtain a polycarbamate, and condensing under heating conditions an aldehyde with said polycarbamate, said aldehyde being utilized in an amount of about 0.5 mole to 4.0 moles per mole of polycarbamate.

5. The resinous condensation product of claim 1 wherein said alkyd resin is prepared from reactants consisting of a glycol and a dicarboxylic acid.

6. The resinous condensation product of claim 1 wherein said alkyd resin is an oil modified alkyd resin.

7. A resinous composition comprising a blend of the condensation product of claim 1 and nitrocellulose.

8. A resinous composition comprising a blend of the condensation product of claim 1 and a carboxyl modified copolymer of vinyl acetate and vinyl chloride.

9. A metallic surface having deposited thereon a heat hardened film of the resinous condensation product of claim 1.

10. The method of claim 4 wherein the aldehyde is formaldehyde.

11. The method of claim 10 wherein the catalyst is zinc acetate.

12. The resinous condensation product of claim 5 wherein said alkyd resin is prepared from reactants consisting of ethylene glycol and adipic acid.

13. The resinous condensation product of claim 5 wherein said alkyd resin is prepared from reactants consisting of ethylene glycol and phthalic acid.

14. The resinous condensation product of claim 6 wherein said alkyd resin is prepared from reactants consisting of monopentaerythritol, phthalic anhydride, and cottonseed oil fatty acids.

15. The resinous condensation product of claim 6 wherein said alkyd resin is prepared from reactants consisting of monopentaerythritol, phthalic anhydride, and coconut oil fatty acids.

References Cited in the file of this patent

UNITED STATES PATENTS

| | | |
|---|---|---|
| 1,877,130 | Hill | Sept. 13, 1930 |
| 2,053,230 | Sussenguth | Sept. 1, 1936 |
| 2,226,202 | Hill | Dec. 24, 1940 |
| 2,329,236 | Alleman et al. | Sept. 14, 1943 |
| 2,374,812 | Gutkin | May 1, 1945 |